United States Patent
Klein et al.

(10) Patent No.: US 11,958,696 B2
(45) Date of Patent: Apr. 16, 2024

(54) METHOD, COMPUTER PROGRAM AND APPARATUS FOR LINING UP PORTIONS OF FOOD SLICES

(71) Applicant: GEA Food Solutions Germany GmbH, Biedenkopf-Wallau (DE)

(72) Inventors: Daniel Klein, Kempten (DE); Stefan Maidel, Kempten (DE); Lars Peter, Forchach (AT)

(73) Assignee: GEA Food Solutions Germany GmbH, Biedenkopf-Wallau (DE)

(*) Notice: Subject to any disclaimer, the term of this patent is extended or adjusted under 35 U.S.C. 154(b) by 208 days.

(21) Appl. No.: 17/609,433

(22) PCT Filed: Apr. 16, 2020

(86) PCT No.: PCT/EP2020/060681
§ 371 (c)(1),
(2) Date: Nov. 8, 2021

(87) PCT Pub. No.: WO2020/233913
PCT Pub. Date: Nov. 26, 2020

(65) Prior Publication Data
US 2022/0234839 A1    Jul. 28, 2022

(30) Foreign Application Priority Data
May 20, 2019   (DE) ............... 10 2019 207 329.8

(51) Int. Cl.
*B65G 47/26* (2006.01)
*B65B 25/06* (2006.01)
*B65G 37/00* (2006.01)

(52) U.S. Cl.
CPC ......... *B65G 47/261* (2013.01); *B65B 37/005* (2013.01); *B65B 25/06* (2013.01); *B65G 2811/095* (2013.01)

(58) Field of Classification Search
CPC ............... B65G 47/261; B65G 37/005; B65G 2811/095; B65G 47/22; B65G 2201/0202; B65G 47/31; B65B 25/06
See application file for complete search history.

(56) References Cited

U.S. PATENT DOCUMENTS

| 6,701,214 B1 * | 3/2004 | Wielebski | B65G 47/261 700/229 |
| 2012/0042757 A1 * | 2/2012 | Weber | B26D 7/325 83/78 |

(Continued)

FOREIGN PATENT DOCUMENTS

| DE | 102015111662 A1 * | 1/2017 | ............... B26D 5/26 |
| EP | 2862683 A1 * | 4/2015 | .......... B25J 11/0045 |

(Continued)

OTHER PUBLICATIONS

International Search Report and Written Opinion, dated Jul. 13, 2020, for International Application PCT/EP2020/060681.

*Primary Examiner* — Gene O Crawford
*Assistant Examiner* — Abby A Jorgensen
(74) *Attorney, Agent, or Firm* — The Dobrusin Law Firm, P.C.

(57) ABSTRACT

A method of lining up portions of slices of food, the portions are transported by a belt conveyor on a plurality of tracks along a conveying direction, one of the plurality of tracks is selected as a first reference track, conveying speeds of a remainder of the plurality of tracks excluding the first reference track are adapted in such a way that the portions are arranged in straight rows arranged orthogonally to the conveying direction when the portions reach a lining-up position, and when the lining-up position is reached, the conveying speeds of the plurality of tracks including the first reference track are aligned to one another.

11 Claims, 3 Drawing Sheets

(56) References Cited

U.S. PATENT DOCUMENTS

| | | | | |
|---|---|---|---|---|
| 2012/0167730 A1* | 7/2012 | Schaub | ............... | B26D 7/32 |
| | | | | 83/663 |
| 2014/0001009 A1* | 1/2014 | Bauer | ............... | B65G 47/642 |
| | | | | 198/370.03 |
| 2014/0299447 A1* | 10/2014 | Bauer | ............... | B65G 37/005 |
| | | | | 198/418 |

FOREIGN PATENT DOCUMENTS

| | | | | |
|---|---|---|---|---|
| EP | 2862683 A1 | 4/2015 | | |
| EP | 3539910 A1 * | 9/2019 | ............ | B65B 25/06 |
| EP | 3539910 A1 | 9/2019 | | |
| FR | 2999549 A1 * | 6/2014 | ........... | B65G 47/261 |
| JP | 2012-217354 A | 11/2012 | | |
| JP | 2012217354 A * | 11/2012 | | |
| WO | WO-2014049170 A1 * | 4/2014 | .............. | B26D 5/20 |
| WO | 2020/050720 A1 | 3/2020 | | |
| WO | WO-2020050720 A1 * | 3/2020 | ........... | B65B 25/065 |

\* cited by examiner

METHOD, COMPUTER PROGRAM AND APPARATUS FOR LINING UP PORTIONS OF FOOD SLICES

CROSS-REFERENCE TO RELATED APPLICATIONS

This application is a US National Stage Entry of PCT/EP2020/060681 filed on Apr. 16, 2020, which claims the benefit of DE 10 2019 207 329.8 filed on May 20, 2019, all of which are hereby incorporated by reference herein for all purposes.

FIELD

The invention relates to a method for lining up portions of slices of food, wherein the portions are transported along a conveying direction by a belt conveyor on a plurality of tracks and are arranged in straight rows arranged orthogonally to the conveying direction.

BACKGROUND

Conventionally, in order to line up the portions, the individual tracks are stopped as soon as the portions of each track have reached a predetermined stopping point. Once all the tracks are stopped, the portions at the stopping point are arranged in rows and can be conveyed onward row by row. However, such a method involves considerable disadvantages. Stopping the tracks slows down operation unnecessarily, as a result of which the throughput of portions is considerably reduced. Furthermore, stopping and subsequently accelerating the tracks is associated with significant material wear and high energy consumption.

SUMMARY

Therefore, the problem addressed by the present invention was that of providing a method for lining up portions of slices of food which does not have the disadvantages of the prior art, but rather does not unnecessarily slow down the conveying of the portions and reduces material wear and energy consumption.

This problem is solved by a method for lining up portions of slices of food, wherein the portions are transported along a conveying direction by a belt conveyor on a plurality of tracks, wherein one track is selected as the first reference track, wherein conveying speeds of the rest of the tracks are adapted in such a way that the portions are arranged in straight rows arranged orthogonally to the conveying direction when the portions reach a lining-up position, wherein, when the lining-up position is reached, the conveying speeds of the tracks are aligned with one another.

The present invention relates to a method for lining up portions of slices of food, wherein the portions are transported along a conveying direction by a belt conveyor on a plurality of tracks, wherein the portions are arranged in straight rows arranged orthogonally to the conveying direction. Instead of stopping the tracks individually one after the other in order to arrange the portions in rows, a first reference track is selected from the tracks. The conveying speeds of the rest of the tracks are now adapted in such a way that the portions are arranged in rows when they reach the lining-up position. In this way, it is advantageously possible to avoid all the tracks having to be stopped.

Portions within the meaning of the present invention can be individual slices of food or can comprise a plurality of slices of food which are for example stacked, lined up in the conveying direction and/or arranged in a staggered manner. A belt conveyor within the meaning of the present invention is a multi-track belt conveyor in which the individual tracks can be driven separately. A slice of food within the meaning of the present invention is for example a slice of sausage, a slice of ham or a slice of cheese. A lining-up position within the meaning of the present invention is a position along the conveying direction. This can be for example one end of the belt conveyor. The rest of the tracks within the meaning of the present invention includes all the tracks which are not the selected first or second reference track.

It is conceivable that, on each track, a plurality of portions are transported and arranged in a plurality of rows one behind the other in the conveying direction. The portions arranged in a plurality of rows then form a format. It is conceivable that, as soon as the portions have finished being arranged in rows, they are transported to a feeder, for example a retracting belt or a conventional conveyor belt, and from there, are each inserted in a packaging tray.

Advantageous embodiments and developments of the invention can be found in the dependent claims and the description with reference to the drawings.

According to one preferred embodiment of the present invention, it is provided that no track is stopped. This makes it possible to further increase the throughput and to minimize the material wear and energy consumption. As a result, it is possible to increase the throughput of portions of slices of food by approximately 20%.

According to another preferred embodiment of the present invention, it is provided that the track on which the portions are arranged furthest to the back in the conveying direction in comparison with the rest of the tracks is selected as the first reference track, wherein the conveying speeds of the rest of the tracks are adapted by deceleration. This makes it possible to line up the portions in a particularly gentle manner, with low material wear and energy consumption. It is conceivable for example for the rest of the tracks to be stopped in the lining-up position, for the conveying speed of the first reference track to not be changed, and for the rest of the tracks to be accelerated when the first reference track reaches the lining-up position in such a way that the conveying speeds of the rest of the tracks correspond to the conveying speed of the first reference track. In other words, the portions on the rest of the tracks are transported to the lining-up position and remain there until the portion on the first reference track also arrives at the lining-up position. The rest of the tracks are then accelerated to form a row.

Alternatively, according to another preferred embodiment of the present invention, it is provided that the track on which the portions are arranged furthest to the front in the conveying direction in comparison with the rest of the tracks is selected as the first reference track, wherein the conveying speeds of the rest of the tracks are adapted by acceleration. The portions are thus lined up more quickly, which noticeably increases the throughput.

Alternatively, it is conceivable for neither the track on which the portions are arranged furthest to the back in the conveying direction in comparison with the rest of the tracks, nor the track on which the portions are arranged furthest to the front in the conveying direction in comparison with the rest of the tracks to be selected as the first reference track. The conveying speeds of the rest of the tracks would then be adapted by acceleration and deceleration.

According to another preferred embodiment of the present invention, it is provided that the portions, after reaching the lining-up position, are transferred from the belt conveyor to another belt conveyor. It is thus advantageously possible to decouple the conveying speeds of the already lined-up portions and downstream portions, which makes it possible to line up the downstream portions quickly.

According to another preferred embodiment of the present invention, it is provided that, after the portions reach the lining-up position, additional portions of slices of food following the portions in the conveying direction are transported along the conveying direction by the belt conveyor on the tracks, wherein one track is selected as the second reference track, wherein conveying speeds of the rest of the tracks are adapted in such a way that the additional portions are arranged in straight rows arranged orthogonally to the conveying direction when the additional portions reach a lining-up position, wherein, when the lining-up position is reached, the conveying speeds of the tracks are aligned to one another. This advantageously makes it possible to allow one or more rows of portions to follow one or more rows of additional portions in the conveying direction. It is conceivable for rows of portions and additional portions to thus be arranged in formats.

According to another preferred embodiment of the present invention, it is provided that the track on which the additional portions are arranged at a distance from the portions that is closest to a target distance is selected as the second reference track. A target distance within the meaning of the present invention is the distance in the conveying direction at which the rows of additional portions are to be arranged from one another after the rows of portions have been lined up. It is thus advantageously possible to precisely position the rows of additional portions in relation to the rows of portions. Selecting the track on which the additional portions are arranged at the distance from the portions that is closest to the target distance as the second reference track makes it possible to line up the portions more quickly and thus to increase the throughput.

For this purpose, it is preferably provided that the conveying speed of the second reference track is adapted in such a way that the additional portions are arranged at the target distance from the portions when the lining-up position is reached. This makes it possible to position the additional portions more precisely when lining them up relative to the portions which are already lined up.

According to another preferred embodiment of the present invention, it is provided that an acceleration and/or deceleration of the tracks is determined on the basis of a distance between the portions or the additional portions of each track and the lining-up position. This makes it possible, in an advantageous manner, to use all of the distance available to compensate for an offset of the portions or additional portions along the conveying direction and to thereby limit the acceleration and/or deceleration to a minimum amount. The thus gentler acceleration and/or deceleration is less abrasive and more energy efficient.

According to another preferred embodiment of the present invention, it is provided that the acceleration and/or deceleration is determined as soon as all the portions or additional portions of each track are transferred from a processing or conveying device arranged in front of the belt conveyor in the conveying direction to the belt conveyor. This makes it possible to accurately analyze the positions of the portions or additional portions along the conveying direction and thus to improve the determination of the acceleration and/or deceleration.

Preferably, it is provided that the portions in an additional lining-up position are arranged in a row and stopped in the additional lining-up position and that, after arranging the portions in the additional lining-up position, the tracks are then started individually when a distance between each portion in the additional lining-up position and each additional portion on the processing or conveying device arranged in front of the belt conveyor in the conveying direction corresponds to the target distance, wherein, after the additional portions are transferred to the belt conveyor, the portions are arranged in a row in the lining-up position. In this case, the portions or additional portions are lined up in the lining-up position and/or the additional lining-up position by means of a method according to any of the embodiments described above. Should three or more rows subsequently be arranged in a format, then the method according to the preferred embodiment shown here can accordingly be carried out with supplementary portions following the additional portions.

It is conceivable for the positions of the portions or additional portions along the conveying direction to be detected by a single sensor device or by one sensor device per track. In addition, it is conceivable for an optical sensor device such as a camera and/or a photoelectric sensor to be used as a sensor device.

To solve the problem mentioned at the outset, the present invention also relates to a computer program for execution on a computer, comprising instructions for carrying out a method according to any of the preceding claims.

To solve the problem mentioned at the outset, the present invention also relates to a device for lining up portions, wherein the device comprises a storage unit, wherein a computer program according to claim 11 is stored in the storage unit.

All of the preceding comments under "disclosure of the invention" apply equally to the method according to the invention, to the computer program according to the invention and to the device according to the invention.

Further details, features and advantages of the invention can be found in the drawings and in the following description of preferred embodiments with reference to the drawings. In this case, the drawings illustrate merely exemplary embodiments of the invention which do not limit the essential inventive concepts.

DETAILED DESCRIPTION

In the different drawings, like parts are always provided with the same reference signs and therefore are generally also named or mentioned only once in each case.

Figure 1A:
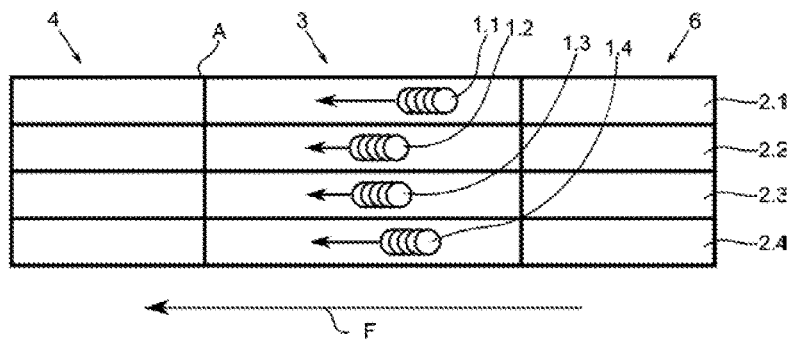
FIGS. 1A-1E are schematic views of the method for lining up portions according to an exemplary embodiment of the present invention by means of a device according to an exemplary embodiment of the present invention.
Figure 1B:
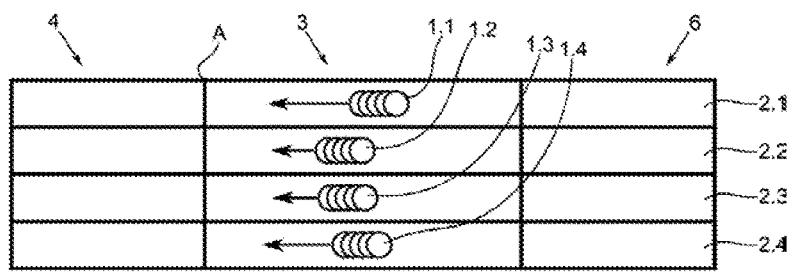
Figure 1C:
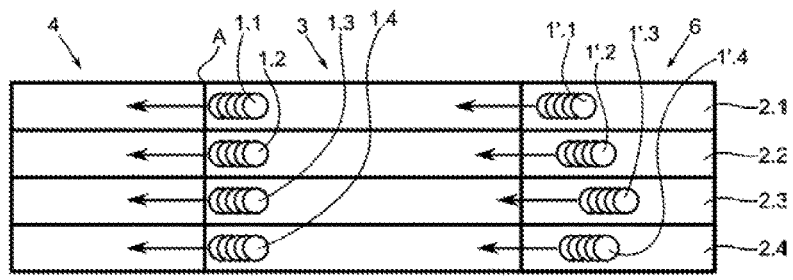
Figure 1D:
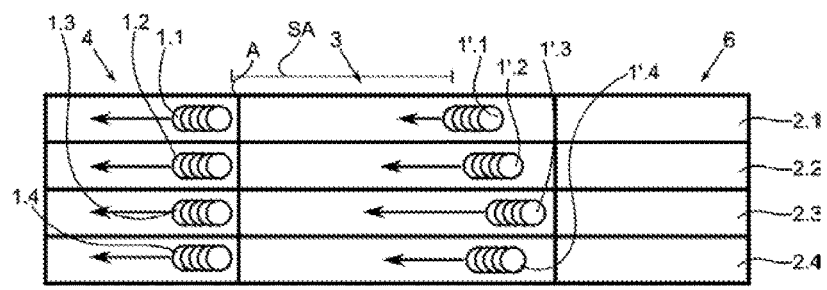
Figure 1E:
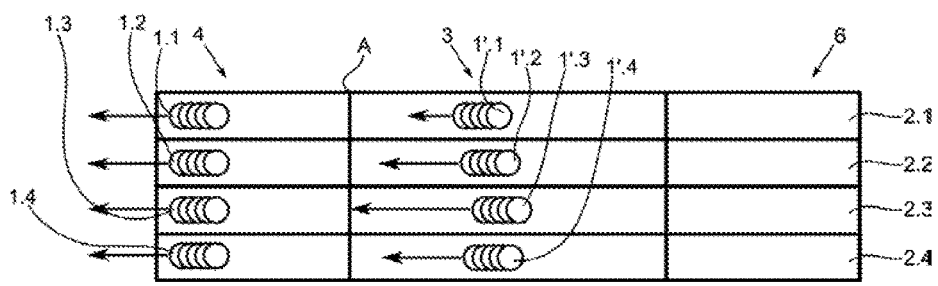

FIGS. 1A1E show consecutive points in time of the method for lining up portions 1.1, 1.2, 1.3, 1.4 according to an exemplary embodiment of the present invention by means of a device according to an exemplary embodiment of the present invention. Firstly, the portions 1.1, 1.2, 1.3, 1.4 at the point in time shown in FIG. 1A are transported in the conveying direction F on a multi-track belt conveyor 3 on the tracks 2.1, 2.2, 2.3, 2.4. In the embodiment shown here, the portions 1.1, 1.2, 1.3, 1.4 comprise staggered slices of food, for example slices of sausage, ham, meat or cheese, but can also comprise a line of slices of food arranged side-by-side in the conveying direction F, slices of food arranged in the shape of a circle, or simply an individual slice of food. It is conceivable for the portions to be packaged or unpackaged. It is also possible for the slides of food to be processed and/or preprocessed. In addition, it is conceivable for example for a portion to comprise slices of food cut and breaded to form a schnitzel.

The portions 1.1, 1.2, 1.3, 1.4 are initially arranged so as to be offset along the conveying direction F. This can be due for example to a preceding processing step, such as slicing up the slices of food in a slicer. To compensate for this offset, a first reference track is determined from the tracks 2.1, 2.2, 2.3, 2.4. The first reference track can be for example the track on which the portion 1.1 is arranged furthest to the back in the conveying direction F. In the exemplary embodiment shown, this would be the first track 2.1 from the top. Alternatively, and shown in this exemplary embodiment, the first reference track can be the track on which the portion 1.2 is arranged furthest to the front in the conveying direction F. In the exemplary embodiment shown, this is the second track 2.2 from the top. In order to arrange the portions 1.1, 1.2, 1.3, 1.4 in a straight row arranged orthogonally to the conveying direction F, the conveying speeds of the first track from the top 2.1, the third track from the top 2.3 and the fourth track from the top 2.4 are then increased in such a way that the offset between the portions 1.1, 1.2, 1.3, 1.4 is reduced (FIG. 1B) and, when the portions 1.1, 1.2, 1.3, 1.4 have reached the lining-up position A, they are arranged in a row. The different conveying speeds are shown by arrows of different lengths.

In FIG. 1C, the time at which the portions 1.1, 1.2, 1.3, 1.4 reached the lining-up position A is shown. The portions 1.1, 1.2, 1.3, 1.4 are then arranged in a row. In order to maintain this arrangement, the conveying speeds of the tracks 2.1, 2.2, 2.3, 2.4 are made uniform, and the portions 1.1, 1.2, 1.3, 1.4 are transferred from the belt conveyor 3 to another belt conveyor 4. On a conveying device 6 arranged in front of the belt conveyor 3 in the conveying direction F, additional portions 1'.1, 1'.2, 1'.3, 1'.4 of slices of food are transported along the conveying direction F to the belt conveyor 3. The additional portions 1'.1, 1'.2, 1'.3, 1'.4 are likewise arranged offset from one another in the conveying direction F and are to be lined up in a row. For this purpose, the additional portions 1'.1, 1'.2, 1'.3, 1'.4 are transferred from the conveying device 6 to the belt conveyor 3.

FIG. 1D shows the point in time at which the additional portions 1'.1, 1'.2, 1'.3, 1'.4 are transferred to the belt conveyor 3. In order to form a format from the rows of the portions 1.1, 1.2, 1.3, 1.4 and additional portions 1'.1, 1'.2, 1'.3, 1'.4, it is desirable for the portions 1.1, 1.2, 1.3, 1.4 and the additional portions 1.1, 1.2, 1.3, 1.4 to be arranged at a previously defined target distance SA from one another along the conveying direction F. In order to increase the efficiency of the lining up, that is to say to increase the throughput of lined-up portions 1.1, 1.2, 1.3, 1.4 and additional portions 1'.1, 1'.2, 1'.3, 1'.4, a second reference track is determined from the tracks 2.1, 2.2, 2.3, 2.4. The second reference track can be for example the track on which the portion 1.3 is arranged furthest to the back in the conveying direction F. In the exemplary embodiment shown, this would be the third track from the top 2.3. Alternatively, the second reference track can be the track on which the portion 1.1 is arranged furthest to the front in the conveying direction F. In the exemplary embodiment shown, this would be the first track 2.1 from the top. In the exemplary embodiment shown here, the track for which the distance along the conveying direction F between the additional portion and the portion is closest to the target distance SA is selected as the second reference track. In the exemplary embodiment shown here, this is the second track from the top 2.2. In order to arrange the additional portions 1'.1, 1'.2, 1'.3, 1'.4 in a straight row arranged orthogonally to the conveying direction F, which is at the target distance SA from the portions 1.1, 1.2, 1.3, 1.4, the conveying speeds of the tracks 2.1, 2.2, 2.3, 2.4 are adapted in such a way that the offset between the additional portions 1'.1, 1'.2, 1'.3, 1'.4 is reduced (FIG. 1E) and, when the additional portions 1'.1, 1'.2, 1'.3, 1'.4 finally reach the lining-up position A, they are arranged in a row and are at the target distance from the portions 1.1, 1.2, 1.3, 1.4. The different conveying speeds are shown by arrows of different lengths.

Figure 2A:
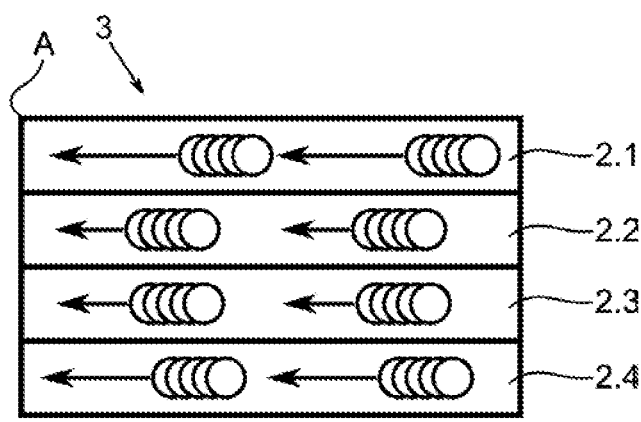
FIGS. 2A-2B are schematic views of the method for lining up portions according to an exemplary embodiment of the present invention.
Figure 2B:
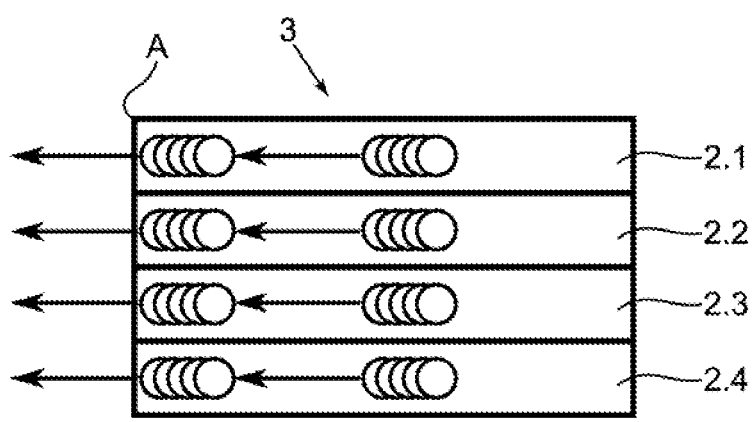

FIGS. 2A and 2B show consecutive points in time of the method for lining up portions (not labeled here for the sake of clarity) according to an exemplary embodiment of the present invention by means of a device according to an exemplary embodiment of the present invention. Instead of simultaneously lining up one portion per track 2.1, 2.2, 2.3, 2.4 in a row, as shown in FIGS. 1A-1E, in this case, two portions per track 2.1, 2.2, 2.3, 2.4 are shown. The distance between the two portions of a track is the same for all the tracks 2.1, 2.2, 2.3, 2.4. Before carrying out the method for lining up according to the exemplary embodiment of the present invention, a first row of portions is formed by stopping the tracks 2.1, 2.2, 2.3, 2.4 in such a way that the portions of the tracks 2.1, 2.2, 2.3, 2.4 are arranged at the same point along the conveying direction and thus form the first row and are transferred to the other belt conveyor. When the distance between the first row and subsequently conveyed portions corresponds to the target distance, the additional lining-up of the portions now takes place exactly as already explained in the description in relation to FIGS. 1A-1C. From the tracks 2.1, 2.2, 2.3, 2.4, a first reference track, in this case the second track from the top 2.2, is selected. The conveying speeds of the rest of the tracks 2.1, 2.3, 2.4 are subsequently adapted in such a way that, when the lining-up position A is reached, two rows of portions are formed. This is shown in FIG. 2B. If the portions are arranged in rows, then the conveying speeds of the tracks 2.1, 2.2, 2.3, 2.4 are made uniform.

Figure 3A:
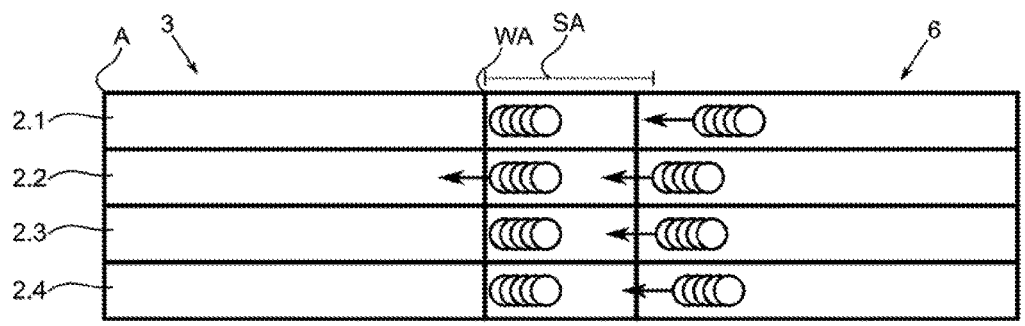
FIGS. 3A-3C are schematic views of the method for lining up portions according to an exemplary embodiment of the present invention.
Figure 3B:
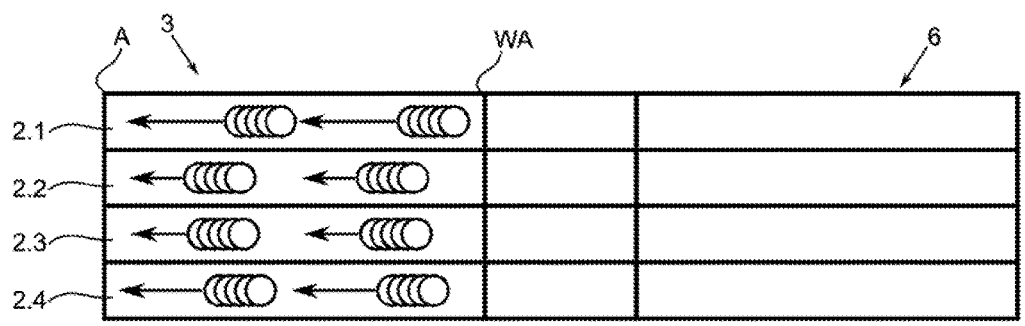
Figure 3C:
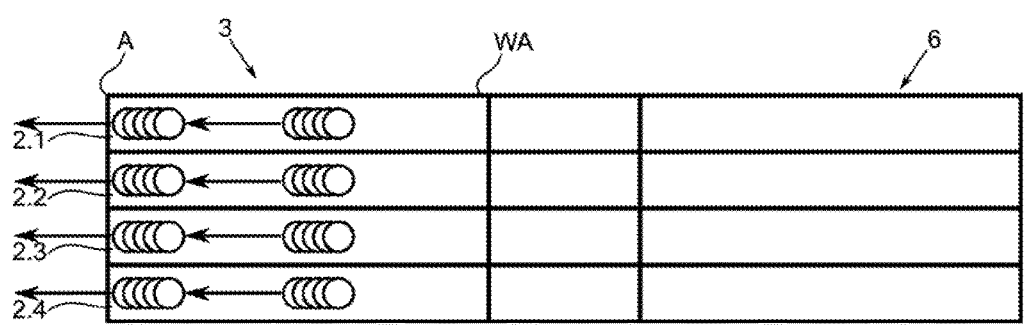

FIGS. 3A-3B show consecutive points in time of the method for lining up portions (not labeled here for the sake of clarity) according to an exemplary embodiment of the present invention by means of a device according to an exemplary embodiment of the present invention. The method from FIGS. 2A and 2B is shown, in which, before lining up the two portions per track 2.1, 2.2, 2.3, 2.4, the distances between the portions and the additional portions are made uniform with a target distance SA. This is shown in FIG. 3A. Transferred from a conveying device 6 arranged in front of the belt conveyor 3 to the belt conveyor 3, the portions arranged in rows arranged orthogonally to the conveying direction are stopped in an additional lining-up position WA. During this process, the conveying device 6 arranged in front of the belt conveyor 3 transports the additional portions in the conveying direction. As soon as the distance between a (stationary) portion and an additional portion following the portion on the same track 2.1, 2.2, 2.3, 2.4 corresponds to the target distance SA, the portion is transported onward. In the view shown here, this is first the case for the portions on the second track from the top 2.2. It is thus ensured that the distance between the two portions of a track is the same for all the tracks 2.1, 2.2, 2.3, 2.4 and corresponds to the target distance (see FIG. 3(*b*)). The additional lining-up of the portions then takes place up exactly as already explained in the description in relation to FIGS. 1A-1C and FIGS. 2A and 2B. From the tracks 2.1, 2.2, 2.3, 2.4, a first reference track, in this case the second track from the top 2.2, is selected. The conveying speeds of the rest of the tracks 2.1, 2.3, 2.4 are subsequently adapted in such a way that, when the lining-up position A is reached, two rows of portions are formed. This is shown in FIG. 2B. If the portions are arranged in rows, then the conveying speeds of the tracks 2.1, 2.2, 2.3, 2.4 are made uniform.

LIST OF REFERENCE SIGNS

1.1, 1.2, 1.3, 1.4 portions
1'.1, 1'.2, 1'.3, 1'.4 additional portions
2.1, 2.2, 2.3, 2.4 tracks
3 belt conveyor
4 additional belt conveyor
5 processing or conveying device
A lining-up position
F conveying direction
SA target distance
WA additional lining-up position

The invention claimed is:

1. A method of lining up portions of slices of food, wherein the portions are transported by a belt conveyor on a plurality of tracks along a conveying direction, the plurality of tracks are arranged in parallel to one another,
wherein one of the plurality of tracks is selected as a first reference track,
wherein conveying speeds of a remainder of the plurality of tracks excluding the first reference track are adapted in such a way that the portions are arranged in straight rows arranged orthogonally to the conveying direction when the portions reach a lining-up position,
wherein, when the lining-up position is reached, conveying speeds of the plurality of tracks including the first reference track are aligned to one another.

2. The method according to claim 1, wherein none of the plurality of tracks are stopped during the method when the first reference track is selected and when the remainder of the plurality of tracks excluding the first reference track are adapted.

3. The method according to claim 1, wherein another one of the tracks on which the portions are arranged furthest to a back in the conveying direction in comparison with the rest of the plurality of tracks is selected as the first reference track, wherein the conveying speeds of the plurality of tracks excluding the first refence track are adapted by deceleration.

4. The method according to claim 1, wherein one of the tracks on which the portions are arranged furthest to a front in the conveying direction in comparison with the rest of the plurality of tracks is selected as the first reference track, wherein the conveying speeds of the rest of the plurality of tracks excluding the first reference track are adapted by acceleration.

5. The method according to claim 1, wherein the portions, after reaching the lining-up position, are transferred from the belt conveyor to another belt conveyor.

6. The method according to claim 1, wherein, after the portions reach the lining-up position, additional portions of slices of food following the portions in the conveying direction are transported along the conveying direction by the belt conveyor on the plurality of tracks, wherein one of the tracks is selected as a second reference track,
wherein conveying speeds of the rest of the tracks excluding the second reference track are adapted in such a way that the additional portions are arranged in straight rows arranged orthogonally to the conveying direction when the additional portions reach the lining-up position,
wherein, when the lining-up position is reached, the conveying speeds of the plurality of tracks including the second reference track are aligned to one another.

7. The method according to claim 6, wherein the track on which the additional portions are arranged at a distance from the portions that is closest to a target distance is selected as the second reference track.

8. The method according to claim 7, wherein the conveying speed of the second reference track is adapted in such a way that the additional portions are arranged at the target distance from the portions when the additional portions reach the lining-up position.

9. The method according to claim 1, wherein an acceleration and/or deceleration of the plurality of tracks is determined on a basis of a distance between the portions or the additional portions (of each of the plurality of tracks and the lining-up position.

10. The method according to claim 9, wherein the acceleration and/or deceleration is determined as soon as all the portions or the additional portions of each of the plurality of tracks are transferred from a processing or conveying device, which is arranged in front of the belt conveyor in the conveying direction to the belt conveyor.

11. A device for lining up the portions, wherein the device comprises;
a belt conveyor having a plurality of tracks that are generally parallel with one another;
wherein one of the plurality of tracks is selected as a first reference track, conveying speeds of a remainder of the plurality of tracks excluding the first reference track are adapted in such a way that the portions are arranged in straight rows arranged orthogonally to a conveying direction when the portions are arranged in straight rows arranged orthogonally to a conveying direction when the portions reach a lining-up position, and when the lining-up position is reached, conveying speeds of the plurality of tracks including the first reference track are aligned to one another, and none of the plurality of tracks are stopped when the first reference track is selected and when the conveying speeds of remainder of the plurality of tracks excluding the first reference track are adapted.

* * * * *